March 15, 1932.  L. LAVEN  1,849,353
INSIDE SUN VISOR FOR VEHICLES
Filed June 22, 1929
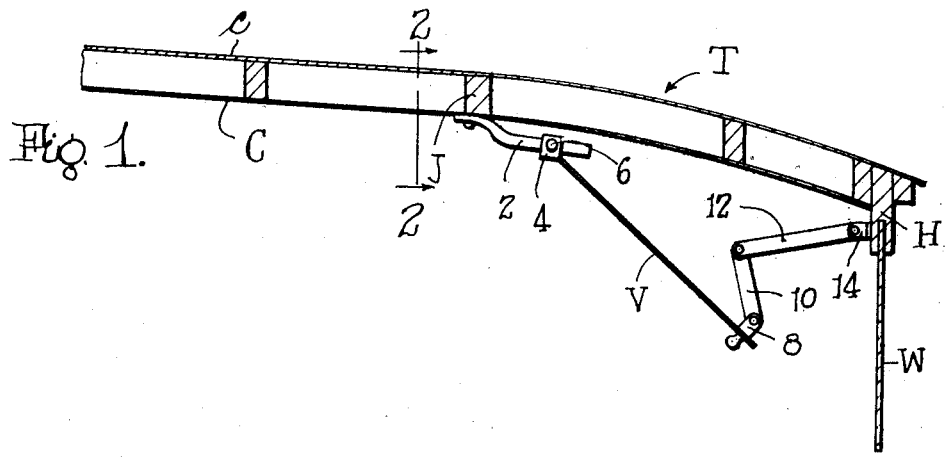
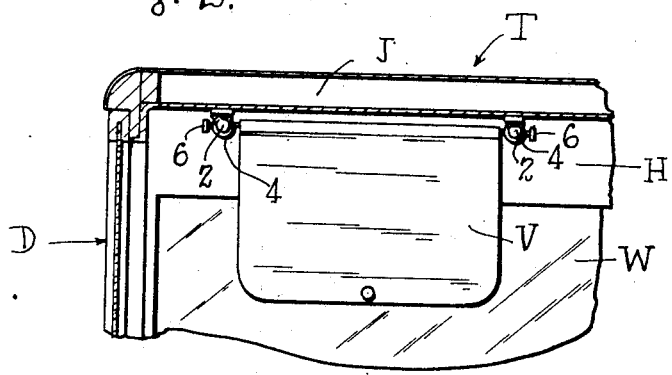
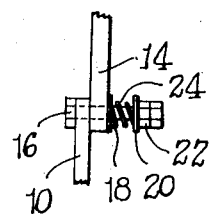
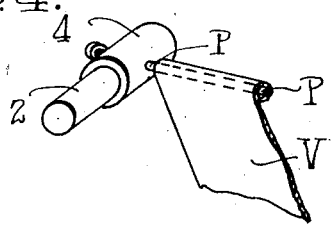
INVENTOR.
Louis Laven
BY
ATTORNEYS.

Patented Mar. 15, 1932

1,849,353

UNITED STATES PATENT OFFICE

LOUIS LAVEN, OF SPRINGFIELD, MASSACHUSETTS

INSIDE SUN VISOR FOR VEHICLES

Application filed June 22, 1929. Serial No. 372,905.

This invention relates to improvements in sun visors for automobiles and is directed particularly to visors for use inside the closed bodies of automobiles and the like.

The principal objects of the invention are the provision of a device of the class described which is adapted to be secured inside the top of a closed automobile and which is adjustable up and down into and out of the line of vision of an operator.

The novel features and advantages of the invention will be observed from the following description of the invention which in the form at present preferred is illustrated in the accompanying drawings, in which:

Fig. 1 is a longitudinal sectional view through the upper forward portion of an automobile body of the so-called "closed" type.

Fig. 2 is a transverse sectional view taken in the line 2—2 of Fig. 1.

Fig. 3 is an enlarged end elevational view of certain details of construction, and Fig. 4 is a perspective view showing the connections between the visor and support therefor.

Referring to the drawings the invention will now be described in detail.

The upper forward section of an automobile is represented by T and includes a plurality of transverse ceiling joists J for supporting outer and inner coverings c and C. A windshield is represented by W at the forward end of the body which underlies a transverse header member H.

A driver facing the windshield is bothered more or less with sunlight and other bright lights and the visor of the invention to obviate the trouble will now be described.

Supports 2 preferably in the form of bars or rods are fixed in spaced relation to one of the joists J and have slidably and adjustably mounted thereon sliders 4 which pivotally receive the trunnions P of a visor V. The sliders are movable into various positions of adjustment along the guides so that the visor may be positioned as desired. Also in that way the guides and other parts may be moved to suit the particular location of the joist J which varies in location on different cars.

The visor V may comprise a relatively thin sheet of metal or consist of a frame enclosing a pane of anti-glare material such as green celluloid, glass or the like.

A bracket 8 at the rear side of the visor has pivoted thereto a link 10, while a similar bracket 14 fixed to the header H has pivoted thereto a link 12. The inner ends of these links 10 and 12 are pivoted together as shown in Fig. 3. In this figure a bolt 16 to serve as a pivot passes through the ends of the levers and between washers 18 and 20 there is mounted a compression spring 24 all of which are held in place by a nut or nuts 22. The spring and other parts are arranged so that the links are frictionally held against relative swinging movements.

In this way the visor may be raised and lowered against the frictional action of the pivoted together links which will hold the visor in any desired position of adjustment and against displacement as might be caused by jarring and the like.

By being pivoted the visor may be raised or lowered into and out of the line of vision of the operator and by reason of the frictional restraining means it will be held in any desired position of adjustment.

Various changes may be made without departing from the spirit and scope of the invention and I prefer therefore to be limited by the appended claims rather than by the foregoing description.

What I claim is:

1. The combination of an autotmobile top and windshield with a sun visor construction comprising in combination, a guide carried by said top, a slide member slidably adjustable on said guide, a visor pivoted at one side edge to said slide for swinging movements and connections between the opposite side edge of said visor and top for holding said visor at opposite sides in various positions.

2. The combination of an automobile top and windshield with a sun visor construction comprising in combination, a guide fixed to said top, a slide member slidably adjustable on said guide movable towards and away from said windshield, a sun visor having a rearward side edge hinged to said slide so that its forward side edge may swing towards and away from said windshield, connections pivoted to the forward side edge of said visor and to said top adjacent the windshield for holding the visor at opposite sides in various positions of adjustment.

3. The combination of an automobile top and windshield with a sun visor construction comprising in combination, spaced longitudinal guides fixed to said top, slide members slidably adjustable on said guides movable towards and away from said windshield, a sun visor having its rearward side edge hinged to said slide members, link connections pivotally connected to the forward side edge of said visor and to a part of said top adjacent said windshield and including frictional devices for holding the visor at opposite sides in various positions of adjustment.

In testimony whereof I affix my signature.

LOUIS LAVEN.